US011820691B2

United States Patent
Higashizawa et al.

(10) Patent No.: US 11,820,691 B2
(45) Date of Patent: Nov. 21, 2023

(54) MANUFACTURING APPARATUS AND MANUFACTURING METHOD FOR OPTICAL FIBER POROUS PREFORM

(71) Applicant: FURUKAWA ELECTRIC CO., LTD., Tokyo (JP)

(72) Inventors: Tatsuyuki Higashizawa, Tokyo (JP); Seiichi Shinada, Tokyo (JP); Masaki Nakajima, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 210 days.

(21) Appl. No.: 16/580,364

(22) Filed: Sep. 24, 2019

(65) Prior Publication Data

US 2020/0017396 A1 Jan. 16, 2020

Related U.S. Application Data

(63) Continuation of application No. PCT/JP2018/009968, filed on Mar. 14, 2018.

(30) Foreign Application Priority Data

Mar. 30, 2017 (JP) .................. 2017-068857

(51) Int. Cl.
 *C03B 37/014* (2006.01)
(52) U.S. Cl.
 CPC .... *C03B 37/01406* (2013.01); *C03B 37/0142* (2013.01); *C03B 37/0144* (2013.01);
 (Continued)
(58) Field of Classification Search
 CPC .............................................. C03B 37/01406
 See application file for complete search history.

(56) References Cited

U.S. PATENT DOCUMENTS

| 4,810,276 A | * | 3/1989 | Gilliland | ........... C03B 37/01473 |
| | | | | 65/427 |
| 6,047,564 A | * | 4/2000 | Schaper | ............ C03B 37/01413 |
| | | | | 65/29.11 |

(Continued)

FOREIGN PATENT DOCUMENTS

| CN | 1382655 A | 12/2002 |
| CN | 101287683 A | 10/2008 |

(Continued)

OTHER PUBLICATIONS

JP2012193066 Machine Translation Performed Mar. 3, 2023. (Year: 2023).*

(Continued)

*Primary Examiner* — Lisa L Herring
(74) *Attorney, Agent, or Firm* — Oblon, McClelland, Maier & Neustadt, L.L.P.

(57) ABSTRACT

A manufacturing apparatus for an optical fiber porous preform includes a reaction chamber configured to accommodate a starting material; at least one main burner provided in the reaction chamber, the at least one main burner being configured to be supplied with a gas containing at least a source gas and a flammable gas, such that particulates are to be generated from reaction of the source gas and the flammable gas and deposited on the starting material; at least one auxiliary burner configured to be directed toward an end portion of the starting material on which the particulates are to be deposited; and an airflow guide provided such that at least part of the airflow guide is located across the at least one auxiliary burner from the starting material.

15 Claims, 7 Drawing Sheets

(52) U.S. Cl.
CPC .... *C03B 37/01486* (2013.01); *C03B 2207/52* (2013.01); *C03B 2207/54* (2013.01)

(56) References Cited

U.S. PATENT DOCUMENTS

| | | | | |
|---|---|---|---|---|
| 6,619,074 | B1* | 9/2003 | Wada | C03B 37/01406 65/27 |
| 2002/0162363 | A1* | 11/2002 | Wada | C03B 37/0144 65/414 |
| 2002/0194879 | A1 | 12/2002 | Takei et al. | |
| 2004/0123630 | A1* | 7/2004 | Sarkar | C03B 37/01473 65/421 |
| 2005/0120752 | A1* | 6/2005 | Brown | C03B 19/1415 65/397 |
| 2008/0087048 | A1 | 4/2008 | Takei et al. | |
| 2014/0144188 | A1 | 5/2014 | Takei et al. | |

FOREIGN PATENT DOCUMENTS

| | | | | |
|---|---|---|---|---|
| CN | 103803789 | A | | 5/2014 |
| CN | 204588997 | U * | 8/2015 | ......... C03B 37/0142 |
| JP | 60-137839 | A | | 7/1985 |
| JP | 2003-165738 | A | | 6/2003 |
| JP | 2004-269284 | A | | 9/2004 |
| JP | 2006-264995 | A | | 10/2006 |
| JP | 2006347780 | A * | 12/2006 | ....... C03B 37/01406 |
| JP | 2010-42940 | A | | 2/2010 |
| JP | 2012116731 | A * | 6/2012 | ....... C03B 37/01406 |
| JP | 2012193066 | A * | 10/2012 | ....... C03B 37/01406 |
| WO | WO 2007/054961 | A2 | | 5/2007 |

OTHER PUBLICATIONS

International Search Report dated Apr. 24, 2018 in PCT/JP2018/009968, filed Mar. 14, 2018 (with English translation).

Written Opinion dated Apr. 24, 2018 in PCT/JP2018/009968, filed Mar. 14, 2018.

Extended European Search Report dated Dec. 4, 2020 in European Patent Application No. 18774435.4, 8 pages.

Combined Chinese Office Action and Search Report dated Jul. 20, 2021 in corresponding Chinese Patent Application No. 201880020381.6 (with English Translation and English Translation of Category of Cited Documents), 19 pages.

* cited by examiner

MANUFACTURING APPARATUS AND MANUFACTURING METHOD FOR OPTICAL FIBER POROUS PREFORM

CROSS-REFERENCE TO RELATED APPLICATION(S)

This application is a continuation of International Application No. PCT/JP2018/009968, filed on Mar. 14, 2018 which claims the benefit of priority of the prior Japanese Patent Application No. 2017-068857, filed on Mar. 30, 2017, the entire contents of which are incorporated herein by reference.

BACKGROUND

The present disclosure relates to a manufacturing apparatus and a manufacturing method for an optical fiber porous preform having an auxiliary burner.

In general, a quartz glass-based optical fiber is manufactured by drawing an optical fiber preform made of quartz glass. The optical fiber preform is manufactured by forming a porous layer by depositing glass particulates on the outer circumference of a target (starting material), and then vitrifying the porous layer by dehydrating and sintering. Here, the porous layer is formed by an outside vapor deposition (OVD) apparatus or the like.

In the OVD apparatus, a flammable gas, a combustion supporting gas, and a glass material are introduced into a glass-particulate synthesizing burner provided in a reaction chamber, and glass particulates generated by flame hydrolysis reaction are deposited in the radial direction of a rotating target. As a result, a porous layer is formed on the outer circumference of the target, and an optical fiber porous preform (hereinafter also referred to as a porous preform) serving as a starting product of an optical fiber preform is manufactured. When manufacturing this porous preform, use of auxiliary burners has been known which perform heating for sintering both end portions of the porous preform, in addition to the glass-particulate synthesizing burner (see Japanese Laid-open Patent Publication No. 2003-165738). Sintering the end portions of the porous preform by using the auxiliary burners makes it possible to suppress cracking (crack) of the deposited porous layer and peeling from the target.

SUMMARY

According to a first aspect of the present disclosure, there is provided a manufacturing apparatus for an optical fiber porous preform. The manufacturing apparatus includes a reaction chamber configured to accommodate a starting material; at least one main burner provided in the reaction chamber, the at least one main burner being configured to be supplied with a gas containing at least a source gas and a flammable gas, such that particulates are to be generated from reaction of the source gas and the flammable gas and deposited on the starting material; at least one auxiliary burner configured to be directed toward an end portion of the starting material on which the particulates are to be deposited; and an airflow guide provided such that at least part of the airflow guide is located across the at least one auxiliary burner from the starting material.

According to a second aspect of the present disclosure, there is provided a manufacturing method for an optical fiber porous preform. The manufacturing method includes supplying gas containing a source gas and a flammable gas to at least one main burner; depositing particulates generated from reaction of the source gas and the flammable gas on a starting material, thereby to form a porous preform, while moving the at least one main burner relative to the starting material; and heating an end portion of the porous preform by an auxiliary burner while reducing, by an airflow guide at least part of which is located across the auxiliary burner from the porous preform, the airflow guide having an opening that allows the auxiliary burner to emit flame, an airflow flowing toward the flame emitted from the auxiliary burner.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

The following describes an exemplary embodiment of the present disclosure with reference to the accompanying drawings. The disclosure, however, is not intended to be limited by the following embodiment. In each of the drawings, identical or corresponding constituent elements are denoted by identical reference signs as appropriate, and redundant explanations are omitted as appropriate. Furthermore, it needs to note that the drawings are schematic and that the relation of dimensions of respective elements and the like may be different from reality. Between the drawings also, portions that the relation of dimensions and the ratios are different from one another may be included.

Figure 1:
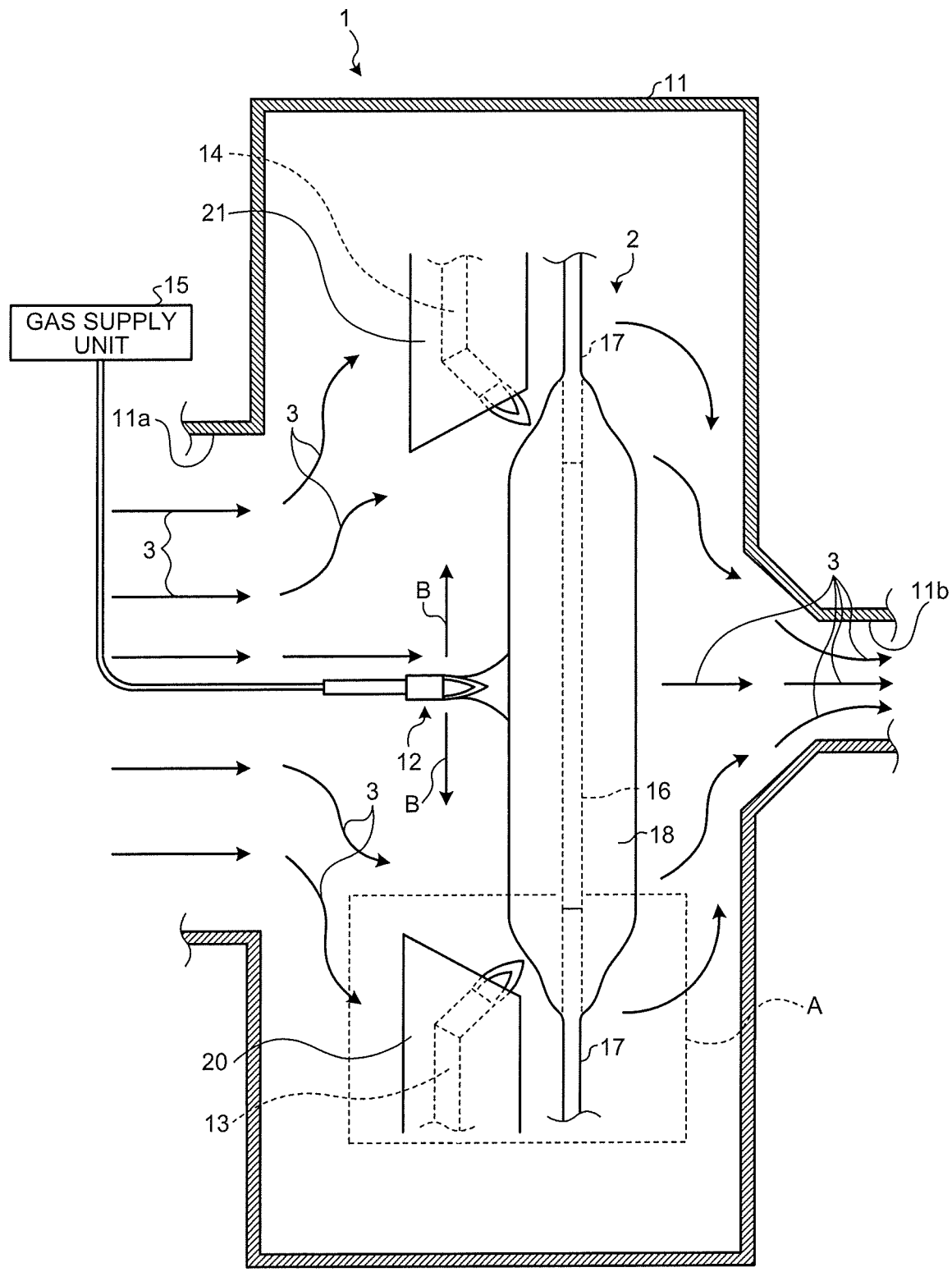
FIG. 1 is a schematic diagram illustrating a principal portion of an OVD apparatus according to one embodiment of the present disclosure.
Figure 2:
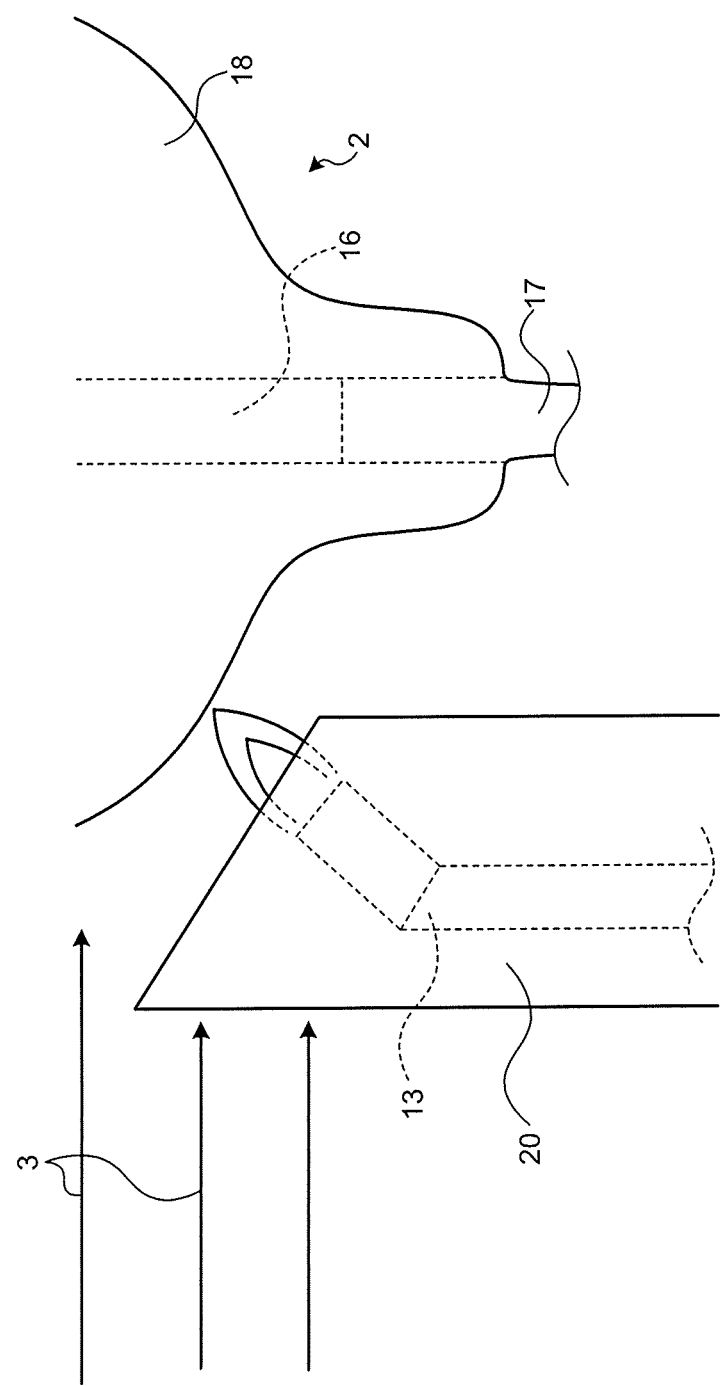
FIG. 2 is an enlarged view enlarging an enclosed portion A in FIG. 1.

First, a manufacturing apparatus and a manufacturing method for optical fiber porous preform according to one embodiment of the present disclosure will be described. FIG. 1 illustrates an outside vapor deposition (OVD) apparatus, which is a manufacturing apparatus for an optical fiber porous preform according to this embodiment. FIG. 2 is an enlarged view of an enclosed portion A in FIG. 1.

As illustrated in FIG. 1, an OVD apparatus 1 includes a reaction chamber 11, a glass-particulate synthesizing burner 12, an auxiliary burner 13 on which a wind guard 20 is arranged, an auxiliary burner 14 on which a wind guard 21 is arranged, and a gas supply unit 15.

The reaction chamber 11 is configured to be able to carry in and accommodate a target 16 and dummy rods 17. In the reaction chamber 11, provided are an air inlet 11a for introducing clean air from the outside or a predetermined air supply unit (not depicted), and an exhaust duct 11b for discharging gas into the reaction chamber 11. As the clean air is introduced into the reaction chamber 11 via the air inlet 11a and discharged from the exhaust duct lib, airflow 3 going toward the exhaust duct 11b from the air inlet 11a is generated in the reaction chamber 11. By the airflow 3, the surplus glass particulates floating in the reaction chamber 11 during the manufacturing of a porous preform 2 can be discharged from the exhaust duct 11b.

The glass-particulate synthesizing burner 12, which is a main burner, is made up of at least a single concentric multi-tube burner for depositing glass particulates on the target 16 as a starting material, or for performing sintering. In the glass-particulate synthesizing burner 12, simultaneously introduced from the gas supply unit 15 are a main raw material gas such as silicon tetrachloride ($SiCl_4$), hydrogen ($H_2$) gas, which is a flammable gas, oxygen ($O_2$) gas, which is a combustion supporting gas, argon (Ar) gas as a blanketing gas, or the like. The dummy rods 17 are connected to corresponding ends of the target 16 and are grasped by corresponding grasping units (not depicted) for driving to rotate and driving to elevate the target 16. In the deposition of the glass particulates, a gas composed of vaporized $SiCl_4$ gas, $H_2$ gas, and $O_2$ gas is supplied while being ignited and burned in the glass-particulate synthesizing burner 12. The $SiCl_4$ that is subjected to hydrolysis reaction in the flames is turned into silica particulates and deposited around the target 16. Along with this, while the target 16 is being rotated, the glass-particulate synthesizing burner 12 is made to repeatedly reciprocate along the longitudinal direction of the target 16 (arrows B in FIG. 1). As a result, the glass particulates are uniformly deposited on the outer circumference of the target 16, and a porous layer 18 in the porous preform 2 is formed. The target 16 is made up of a portion to be a core when made into an optical fiber, and a portion to be a cladding formed around the core. The porous layer 18 turns into a cladding portion that is integrated with a portion to be the cladding of the target 16 when made into an optical fiber later.

As illustrated in FIG. 2, each of the auxiliary burners 13 and 14 is provided in vicinities of the corresponding end portions along the longitudinal direction of the target 16. The positions of the auxiliary burners 13 and 14 are immovable with respect to the end portions of the target 16. This configuration enables the auxiliary burners 13 and 14 to be able to heat both end portions of the porous preform 2 to be manufactured. In the auxiliary burners 13 and 14, from a predetermined combustion gas supply unit (not depicted), a flammable gas such as $H_2$ gas and a combustion supporting gas such as $O_2$ gas are introduced, for example. The flammable gas and the combustion supporting gas are ignited and burned in the auxiliary burners 13 and 14, and the end portions of the target 16 are heated.

Figure 3:
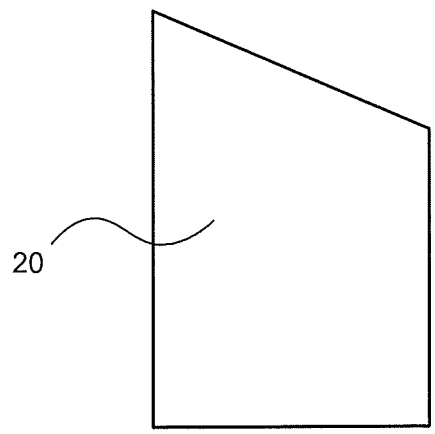
FIG. 3 is a side view of a wind guard in the embodiment of the present disclosure.
Figure 4:
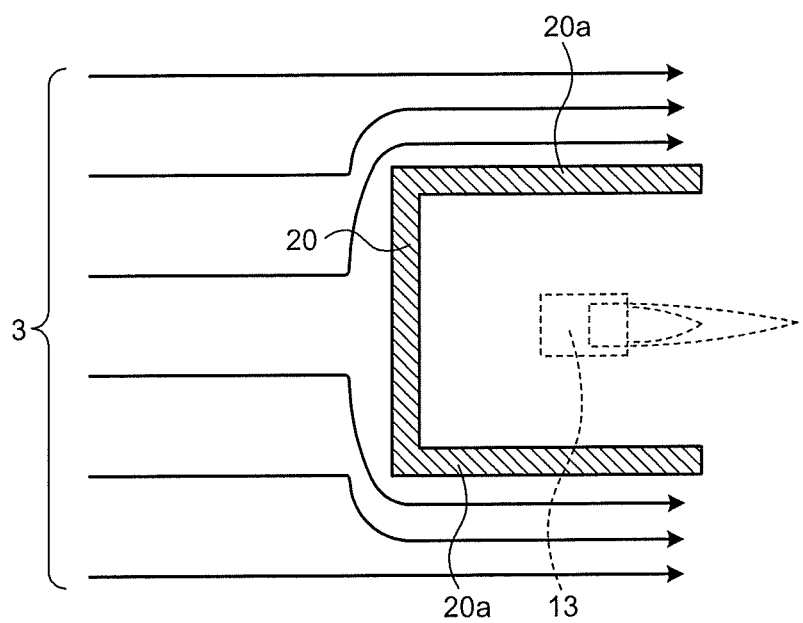
FIG. 4 is a top view of the wind guard in the embodiment of the present disclosure.

FIG. 3 and FIG. 4 are respectively a side view and a top view of the wind guards 20 and 21 in this embodiment. As illustrated in FIG. 2, FIG. 3, and FIG. 4, the wind guards 20 and 21 serving as an airflow guiding unit in this embodiment are respectively provided in the vicinity of the auxiliary burners 13 and 14. The wind guards 20 and 21 are open on at least a flame emission side thereof such that the auxiliary burners 13 and 14 emit the flame. Furthermore, each of the wind guards 20 and 21 has a shape covering, with respect to the auxiliary burners 13 and 14, the side opposite to the flame emission side of the flames, and lateral sides as viewed from the flame emission side. Specifically, in this embodiment, the shape of the wind guards 20 and 21 in a lateral view (see FIG. 3) seen from the plane in FIG. 2 (hereinafter referred to as a lateral surface shape) is a trapezoidal shape having a tapered portion corresponding to the shape of the end portion of the porous preform 2. Furthermore, the shape of the wind guards 20 and 21 in FIG. 2 in top view (see FIG. 4) seen from the upper portion (hereinafter referred to as an upper surface shape) is a U-shape that covers and guards the lateral sides of the auxiliary burners 13 and 14. The wind guards 20 and 21 are made of titanium (Ti) or a Ti alloy, for example. Ti and Ti alloys may be chosen, from the viewpoint of corrosion resistance and durability, as the material of the wind guards 20 and 21 that are arranged in the vicinities of the corresponding auxiliary burners 13 and 14. For the material of the wind guards 20 and 21, a material such as quartz glass may be employed, which has corrosion resistance and heat resistance and is easy to process.

As illustrated in FIG. 2, the wind guard 20 is located upstream in the direction of the airflow 3 in relation to the auxiliary burner 13 such that the wind guard 20 is open downstream in the direction of the airflow 3. Namely, the wind guard 20 is arranged such that the airflow 3 does not directly blow against the auxiliary burner 13. Furthermore, as illustrated in FIG. 4, as the airflow 3 is guided by lateral plates 20a of the wind guard 20 on the lateral sides of the auxiliary burner 13, the airflow 3 can be restrained from going around toward the open portion of the wind guard 20. This configuration prevents the airflow 3 from going toward the flames of the auxiliary burner 13. Accordingly, the flames of the auxiliary burner 13 can be restrained from being disturbed greatly by the airflow 3, and the flames can be stabilized. Thus, the end portions of the porous preform 2 are stably heated and sufficiently sintered. In addition, because the gas flow rate of the glass-particulate synthesizing burner 12 is larger as compared with the auxiliary burners 13 and 14, it is less probable that the flame from the glass-particulate synthesizing burner 12 is disturbed greatly by the airflow 3.

Next, first to seventh modifications of the wind guard in the embodiment of the present disclosure will be described.

First Modification

Figure 5:
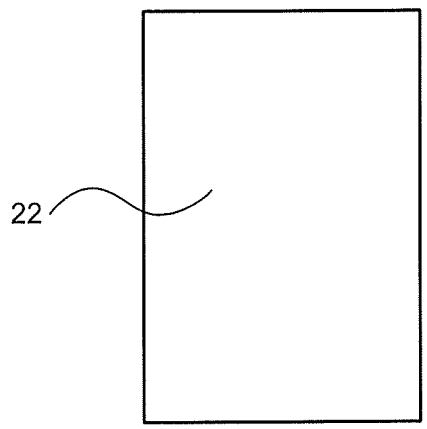
FIG. 5 is a side view illustrating a wind guard according to a first modification of the above embodiment.

FIG. 5 is a side view illustrating a wind guard 22 according to a first modification of the above embodiment. As illustrated in FIG. 5, the lateral surface shape of the wind guard 22 in the first modification is rectangular, for example.

Second Modification

Figure 6:
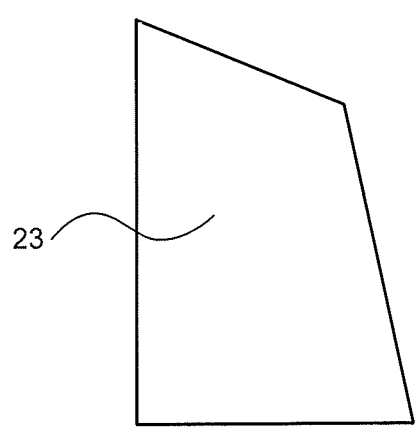
FIG. 6 is a side view illustrating a wind guard according to a second modification of the above embodiment.

FIG. 6 is a side view illustrating a wind guard 23 according to a second modification of the above embodiment. As illustrated in FIG. 6, the lateral surface shape of the wind guard 23 in the second modification is tetragonal in which the upper portion is tapered corresponding to the shape of the end portion of the porous preform 2. The side on the porous preform 2 side of the wind guard 23 has a tapered shape expanding toward the lower portion.

Third Modification

Figure 7:
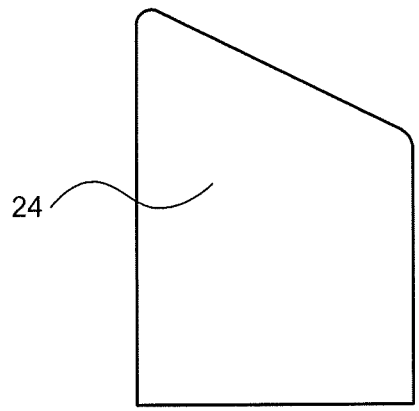
FIG. 7 is a side view illustrating a wind guard according to a third modification of the above embodiment.

FIG. 7 is a side view illustrating a wind guard 24 according to a third modification of the above embodiment. As illustrated in FIG. 7, the wind guard 24 in the third modification has a lateral surface shape in which a corner of the upper portion in the lateral surface shape of the wind guard 20 in the above-described embodiment is rounded.

Fourth Modification

Figure 8:
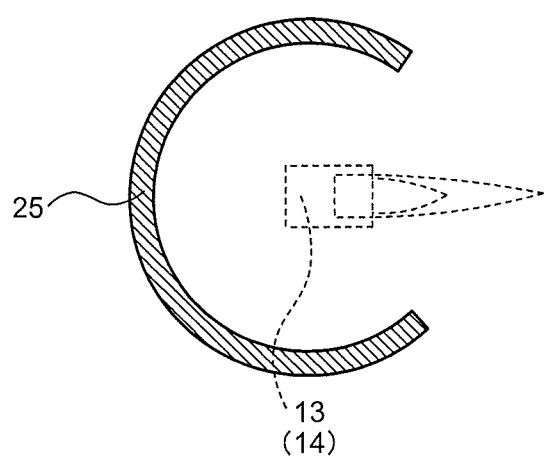
FIG. 8 is a top view illustrating a wind guard according to a fourth modification of the above embodiment.

FIG. 8 is a top view illustrating a wind guard 25 according to a fourth modification of the above embodiment. As illustrated in FIG. 8, the upper surface shape of the wind guard 25 in the fourth modification is C-shaped, in which the flame emission side of the auxiliary burner 13 or 14 is open. The wind guard 25 has a shape covering a side of the auxiliary burner 13 or 14, the side being opposite to the flame emission side, and the lateral sides as viewed from the flame emission side.

Fifth Modification

Figure 9:
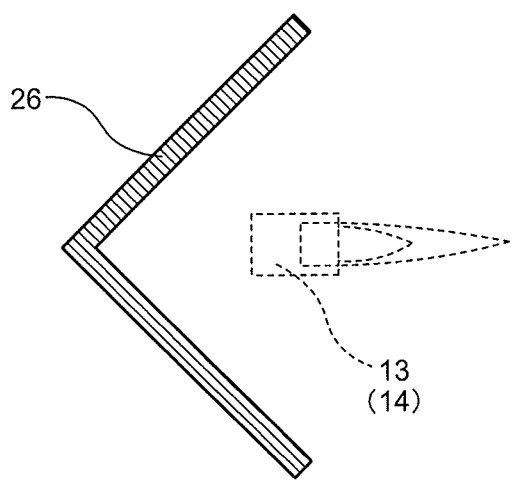
FIG. 9 is a top view illustrating a wind guard according to a fifth modification of the above embodiment.

FIG. 9 is a top view of a wind guard 26 according to a fifth modification of the above embodiment. As illustrated in FIG. 9, the upper surface shape of the wind guard 26 in the fifth modification is L-shaped in which the flame emission side of the auxiliary burner 13 or 14 is open. The wind guard 26 has a shape covering a side of the auxiliary burner 13 or 14, the side being opposite to the flame emission side, and the lateral sides as viewed from the flame emission side.

Sixth Modification

Figure 10:
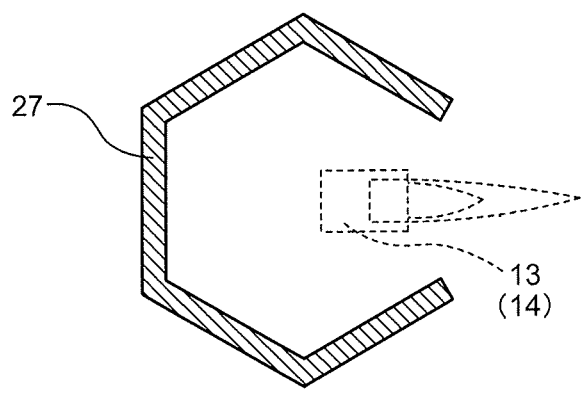
FIG. 10 is a top view illustrating a wind guard according to a sixth modification of the above embodiment.

FIG. 10 is a top view of a wind guard 27 according to a sixth modification of the above embodiment. As illustrated in FIG. 10, the wind guard 27 in the sixth modification has an upper surface shape of even-numbered polygon, for example, a hexagon, in which one side on the flame emission side of the auxiliary burner 13 or 14 is open. The wind guard 27 has a shape covering a side of the auxiliary burner 13 or 14, the side being opposite to the flame emission side, and the lateral sides as viewed from the flame emission side.

Seventh Modification

Figure 11:
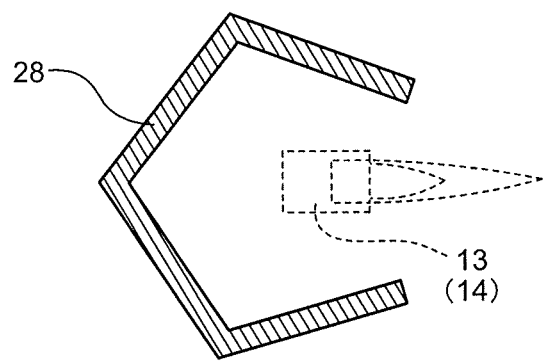
FIG. 11 is a top view illustrating a wind guard according to a seventh modification of the above embodiment.

FIG. 11 is a top view of a wind guard 28 according to a seventh modification of the above embodiment. As illustrated in FIG. 11, the wind guard 28 in the seventh modification is an upper surface shape of odd-numbered polygon, for example, in a pentagon in which one side on the flame emission side of the auxiliary burner 13 or 14 is open. The wind guard 28 has a shape covering a side of the auxiliary burner 13 or 14, the side being opposite to the flame emission side, and the lateral sides as viewed from the flame emission side.

The lateral surface shape (FIG. 3) and the upper surface shape (FIG. 4) in the embodiment, the lateral surface shapes by the first to the third modifications (FIG. 5 to FIG. 7), and the upper surface shapes by the fourth to the seventh modifications (FIG. 8 to FIG. 11) in the foregoing can be selected and combined as appropriate. Specifically, the wind guard can be in various shapes, such as a wind guard having the lateral surface shape by the embodiment (see FIG. 3) and having the upper surface shape by the fourth modification (see FIG. 8), a wind guard having the lateral surface shape by the second modification (see FIG. 6) and having the upper surface shape by the seventh modification (see FIG. 11), and the like, for example.

The embodiment of the present disclosure in the foregoing enables the wind guards 20 and 21 serving as an airflow guiding unit to prevent the airflow 3 in the reaction chamber 11 from directly blowing against the flames of the auxiliary burner 13 and 14, respectively, and thus the flames are not greatly disturbed by the airflow 3 are stabilized, the sintering of the end portions of the porous preform 2 can be performed sufficiently. Thus, in the vitrification process performed after manufacturing the porous preform 2, the occurrence of cracks in the porous preform 2 can be suppressed.

In the foregoing, the embodiment of the present disclosure has been explained concretely. However, the present disclosure is not limited to the above-described embodiment, and various modifications based on the technical idea of the present disclosure can be made. For example, the numerical values presented in the above-described embodiment are mere examples, and different numerical values may be used as needed.

While, in the above-described embodiment, the example using $SiCl_4$ as the glass material has been illustrated, for the glass material, $SiHCl_3$, $SiHCl_2$, and the like may be used, for example, and for Ge raw material as a dopant, $GeCl_4$ may further be used. Moreover, a glass material such as siloxane may be used. Furthermore, as the flammable gas, in addition to $H_2$, a short-chain hydrocarbon such as $CH_4$, $C_2H_6$, $C_3H_8$, $C_4H_{10}$, and the like may be used, for example.

In the above-described embodiment, the glass-particulate synthesizing burner 12 has been made to reciprocate along the longitudinal direction of the target 16. However, the glass-particulate synthesizing burner 12 and the porous preform 2 only need to reciprocate relatively, and the porous preform 2 can be made to reciprocate with the glass-particulate synthesizing burner 12 standing still.

Furthermore, in the above-described third modification, an example of a shape for which the upper corner is rounded in the lateral surface shape of the wind guard 20 by the embodiment has been illustrated. However, it may be a shape for which the upper corner is rounded in the lateral surface shape of the wind guard 22 by the first modification or in the lateral surface shape of the wind guard 23 by the second modification.

With the manufacturing apparatus and the manufacturing method for the optical fiber porous preform of the present disclosure, the airflow guiding unit provided in the circumference of the auxiliary burner can suppress the flames of the auxiliary burner from being greatly disturbed, so that it is possible to sufficiently sinter the end portion of the optical fiber porous preform and to suppress the occurrence of cracks in the optical fiber porous preform in the vitrification process that is a post-process.

As in the foregoing, the manufacturing apparatus and the manufacturing method for the optical fiber porous preform according to the present disclosure are suitable for application to the manufacture of an optical fiber porous preform.

What is claimed is:

1. A manufacturing apparatus for an optical fiber porous preform, the manufacturing apparatus comprising:
   a reaction chamber, having an air inlet and an exhaust duct, configured to accommodate a starting material;
   at least one main burner provided in the reaction chamber, the at least one main burner being configured to be supplied with a source gas and a flammable gas, such that particulates are to be generated from reaction of the source gas and the flammable gas and deposited on the starting material, the at least one main burner being made to repeatedly reciprocate along a longitudinal direction of the starting material;
   at least one auxiliary burner configured to be directed toward an end portion of the starting material on which the particulates are to be deposited; and
   an airflow guide provided on an upstream side of each of the at least one auxiliary burner to prevent an airflow flowing from the air inlet to the exhaust duct from directly blowing against the at least one auxiliary burner, the airflow guide being open on a flame emission side thereof such that the at least one auxiliary burner emits a flame, and having a shape covering, with respect to the at least one auxiliary burner, a side opposite to the flame emission side, and lateral sides as viewed from the flame emission side in their entirety, wherein the at least one auxiliary burner is located closer to the end portion of the optical fiber porous preform than the at least one main burner, the at least one auxiliary burner is configured to be immovable with respect to the starting material, the at least one auxiliary burner is inclined with respect to a longitudinal direction of the optical fiber porous preform so as to face a preform shape of the end portion of the optical fiber porous preform, the at least one auxiliary burner is configured to be supplied with the flammable gas, the source gas is not supplied to the at least one auxiliary burner, and a flame of the at least one auxiliary burner is positioned at an inclined part at an end part of the optical fiber porous preform where a diameter of the optical fiber porous preform is decreased to a direction of the end part in an axial direction of the optical fiber porous preform.

2. The manufacturing apparatus for the optical fiber porous preform according to claim 1, wherein the shape of the airflow guide is a hexagon, in which one side on the flame emission side of the at least one auxiliary burner is open.

3. The manufacturing apparatus for the optical fiber porous preform according to claim 1, wherein the shape of the airflow guide is a pentagon, in which one side on the flame emission side of the at least one auxiliary burner is open.

4. The manufacturing apparatus for an optical fiber porous preform according to claim 1, wherein the airflow guide is made of Titanium or Ti alloy.

5. The manufacturing apparatus for an optical fiber porous preform according to claim 1, wherein the source gas includes silicon tetrachloride ($SiCl_4$).

6. The manufacturing apparatus for an optical fiber porous preform according to claim 1, wherein the flammable gas includes $H_2$.

7. The manufacturing apparatus for an optical fiber porous preform according to claim 1, wherein the at least one auxiliary burner is further configured to be supplied with a combustion supporting gas.

8. The manufacturing apparatus for an optical fiber porous preform according to claim 7, wherein the combustion supporting gas includes $O_2$.

9. A manufacturing method for an optical fiber porous preform, the manufacturing method comprising:
supplying a source gas and a flammable gas to at least one main burner;
depositing particulates generated from reaction of the source gas and the flammable gas on a starting material that is accommodated in a reaction chamber that has an air inlet and an exhaust duct, thereby to form an optical fiber porous preform, while moving the at least one main burner relative to the starting material, the at least one main burner being made to repeatedly reciprocate along a longitudinal direction of the starting material; and
heating an end portion of the optical fiber porous preform by an auxiliary burner while reducing an airflow toward a flame emitted from the auxiliary burner by an airflow guide provided on an upstream side of the auxiliary burner to prevent an airflow flowing from the air inlet to the exhaust duct from directly blowing against the auxiliary burner, the airflow guide having an opening that allows the auxiliary burner to emit the flame, the airflow guide having a shape covering, with respect to the auxiliary burner, a side opposite to the flame emission side, and lateral sides as viewed from the flame emission side in their entirety, wherein
the auxiliary burner is located closer to the end portion of the optical fiber porous preform than the at least one main burner, the auxiliary burner is configured to be immovable with respect to the starting material, the auxiliary burner is inclined with respect to a longitudinal direction of the optical fiber porous preform so as to face a preform shape of the end portion of the optical fiber porous preform, the auxiliary burner is configured to be supplied with the flammable gas, the source gas is not supplied to the auxiliary burner, and a flame of the auxiliary burner is positioned at an inclined part at an end part of the optical fiber porous preform where a diameter of the optical fiber porous preform is decreased to a direction of the end part in an axial direction of the optical fiber porous preform.

10. The manufacturing method for an optical fiber porous preform according to claim 9, wherein the shape of the airflow guide is a pentagon, in which one side on the flame emission side of the auxiliary burner is open.

11. The manufacturing method for an optical fiber porous preform according to claim 9, wherein the source gas includes silicon tetrachloride ($SiCl_4$).

12. The manufacturing method for an optical fiber porous preform according to claim 9, wherein the flammable gas includes $H_2$.

13. The manufacturing method for an optical fiber porous preform according to claim 9, wherein the auxiliary burner is further configured to be supplied with a combustion supporting gas.

14. The manufacturing method for an optical fiber porous preform according to claim 13, wherein the combustion supporting gas includes $O_2$.

15. The manufacturing method for an optical fiber porous preform according to claim 9, wherein the shape of the airflow guide is a hexagon, in which one side on the flame emission side of the auxiliary burner is open.

* * * * *